Dec. 21, 1943.　　　　P. G. PEIK　　　　2,337,525

SOUND DEADENER

Filed April 21, 1941

INVENTOR
Paul G. Peik
BY Evans + McCoy
ATTORNEYS

Patented Dec. 21, 1943

2,337,525

UNITED STATES PATENT OFFICE 2,337,525

SOUND DEADENER

Paul G. Peik, Akron, Ohio, assignor to The General Tire & Rubber Company, Akron, Ohio, a corporation of Ohio Application April 21, 1941, Serial No. 389,489

13 Claims. (Cl. 20—6)

This invention relates to a method and apparatus for dampening the vibration of panels and the like. It particularly relates to a floor covering having marked vibration-absorbing and dampening characteristics, and which is suitable for application to automobile floor panels.

Floor panels of automobiles have a marked tendency to be vibrated by shocks incident to traveling over the road, engine vibration, etc., and these panels are the greatest source of noise in automobiles. In order to reduce this noise various materials, such as relatively thick rubber mats, plastic compositions, etc. have been applied over the panel surface. Rubber, although it would appear to have many inherent advantages over other materials, has very little deadening effect, and it has therefore been the usual practice to coat the surface of the panel with a plastic dampening material, over which a jute mat and a rubber mat or carpet are successively superimposed. Although the jute mat is desirable, both for heat and sound insulation, it has substantially no sound-deadening effect or effect in reducing the vibration of the source of sound, and even such a composite structure has an unsatisfactory sound rating.

It is an object of the present invention to provide a rubber or rubberlike mat having sufficient vibration-dampening capacity to lower the noise rating of automobile floor panels to a satisfactory level without the aid of additional materials.

It is another object of the present invention to provide low-cost automobile floor mats having a high degree of sound-deadening and thermal-insulating efficiency.

Other objects will be apparent from the following description of the invention, as illustrated by the drawing, in which.

Figure 1:
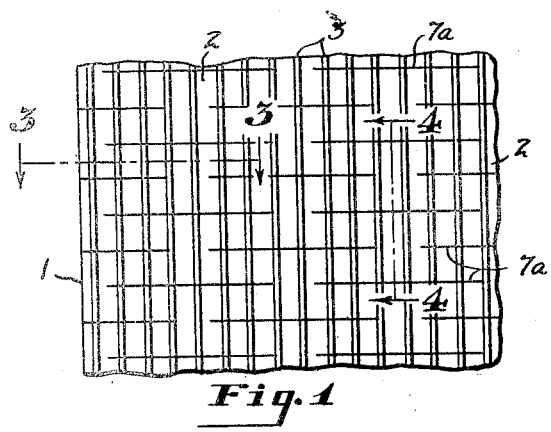
Figure 1 is a plan view of a vibration dampener embodying the present invention, looking at the under surface, which is to be applied in contact with the panel, and showing the elements of the mat or dampener in their normal position.

According to the present invention, the vibrating energy is rapidly absorbed from floor panels and the like by applying thereover a mat or pad of rubberlike material, arranged so that it will closely follow the contour of the vibrating panel and absorb the energy therefrom, both by relative surface movement between the mat and the panel and by internal friction within the mat itself.

Referring more particularly to the drawing, in which like parts are indicated by the same numerals of reference throughout the several views, my improved vibration dampening material comprises a pad or mat 1 of rubberlike material, having a body portion 2 which serves as a web to hold a plurality of vibration absorbing projections, such for example as ribs 3, in suitable spaced relationship. The ribs are integral with the body portion and extend from an under surface 4 of the body portion 2.

The ribs 3 may, if desired, extend continuously the length of the mat and they are preferably of rubber or rubberlike material, of a type having relatively high internal friction and relatively high stiffness. The ribs 3 may project substantially perpendicularly from the under surface 4 of the body 2 of the mat, or if desired, some or all of them may be inclined with respect to the plane of the body portion 2. The mat is placed on a panel 6 so that the free ends of the projections 3 are in contact with the panel. Apparently the ribs 3 function to absorb vibration energy by relative surface movement between the mat and the panel; therefore, they should preferably be free to bend but yet be sufficiently stiff so that they will not readily buckle before slippage on the surface begins.

When the body portion 2 of the vibration-absorbing mat or pad 1 is unslotted and relatively stiff, it has been found that for the highest sound deadening effect the projections or ribs 3 should be relatively closely spaced and should be designed to have the lowest possible natural frequency of vibration consistent with sufficient stiffness to secure a scrubbing action on the surface of the floor panel when the ribs are bent by relative movement of the body portion with respect to the contacting panel. An increase in length of the ribs 3 gives an increase in absorbing efficiency up to a length to thickness ratio of about 4. Generally, the length to thickness ratio of the projections should be greater than 1, and preferably between 2 and 4. They should for greater efficiency be of about uniform height.

The ribs 3 should be unrestrained except for their internal resistance so that free bending in at least one direction is permitted and there will be relative movement when they are periodically compressed by vibration energy on the floor panel. Cross ribs are undesirable as they have been found to reduce the bending action of the ribs so that they act substantially as a solid sheet of rubber and have very low vibration-absorbing efficiency.

When the projections are spaced sufficiently close together to prevent convection currents in the air within spaces or grooves 8 separating the successive ribs or projections, the mat has substantial thermal insulation. Thermal insulation is also much improved by reducing the area of rubberlike material in contact with the floor to a minimum. This is preferably accomplished by tapering the ribs to almost a knifelike edge at their unattached end. It has been found that a mat having a body portion ⅛ inch thick and parallel ribs 5/64 inch thick at the base, 5/64 inch high and spaced ⅛ inch apart and tapering to substantially a knifelike edge, has an insulation factor of 3.96, which compares favorably with a blanket of good fibrous insulating material ⅜ inch thick. Generally, a spacing of less than ¼ inch has been found to be desirable in order to provide adequate support for the body portion, and a spacing of 1/16 inch or less gives improved results.

Figure 2:
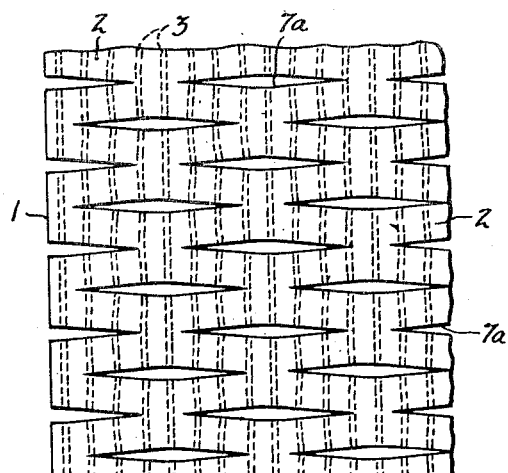
Fig. 2 is a plan view showing a mat embodying the present invention in extended position to illustrate the accordion-like movement obtainable with the preferred form of mat.
Figure 3:
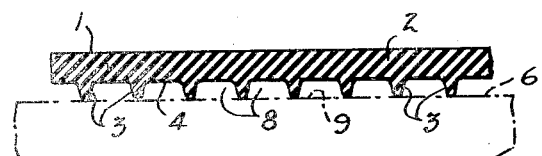
Fig. 3 is a vertical, sectional view, taken on the line 3—3 of Fig. 1, showing a portion of the mat in contact with a portion of a suitable floor panel.
Figure 4:
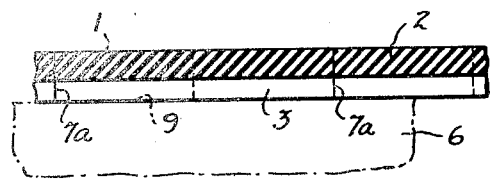
Fig. 4 is a vertical, sectional view, taken on the line 4—4 of Fig. 1.
Figure 5:
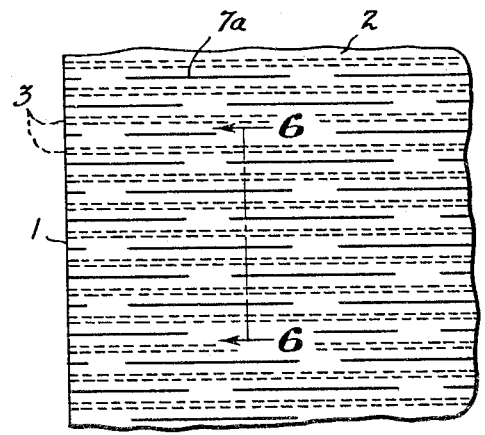
Fig. 5 is a plan view of a portion of a modified form of sound deadener embodying my invention.
Figure 7:
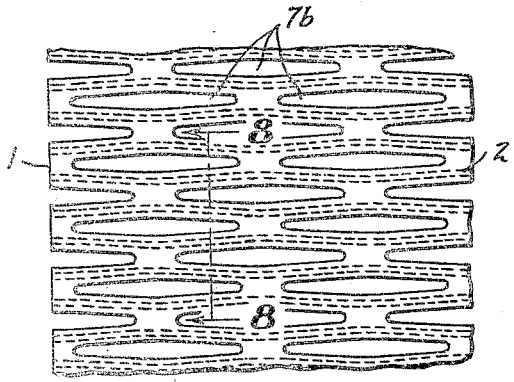
Fig. 7 is a plan view of a portion of still another modified form of the present invention having relatively wide cuts or slots.
Figure 6:
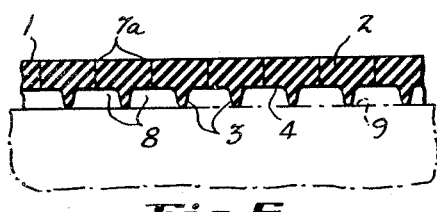
Fig. 6 is a sectional view, taken on the line 6—6 of Fig. 5, showing the sound deadener in contact with a portion of a suitable panel.
Figure 8:
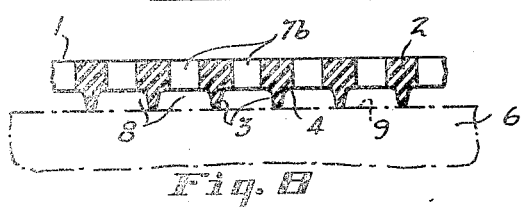
Fig. 8 is a sectional view on the line 8—8 of Fig. 7.

While the deadening efficiency of an unslotted floor mat, or one having a solid body portion and a plurality of projections as above described extending from its lower surface, is much superior to that of a mat having no projections, I have found that the deadening efficiency is still further and to a marked degree improved by means, such as suitable cuts 7, including slits 7a and slots 7b, for separating portions of the mat from each other, and for increasing the flexibility and deformability of the mat. The cuts 7 should extend throughout the mat and preferably be staggered in both directions with adjacent cuts separated and offset from each other, so that when the mat or pad is stressed perpendicularly to the major axis of the cuts, these latter will open up and separate, as shown in Fig. 2. When the cuts are offset from each other, the mat may be extended and contracted in a manner similar to the bellows of an accordion, as shown in Figs. 1 and 2. This accordion action greatly improves the contact of the mat on a vibrating panel and the sound deadening efficiency of such a mat is much greater than that of a mat of similar weight and of a similar compound and having cuts the same size, with identical spacing, but which are not offset from each other. The cuts 7 may be either parallel with the ribs 3, shown in Figs. 5 through 8, or they may run at an angle relative thereto, as illustrated by Figs. 1 through 4.

As the length of the cuts 7 is increased, it appears from my observations that the sound deadening efficiency of the mat increases until the elasticity due to the accordion effect is so reduced that the mat cannot regain its original shape against surface friction of the vibrating panel. Preferably, the length of the cuts in a mat of the deader rubber stocks is in the neighborhood of about 1 to about 1½ inches. The cuts are preferably spaced from each other by about ¼ inch; as the spacing is increased from this the efficiency appears to decrease somewhat, but as the spacing is decreased to as little as ⅛ inch, the efficiency appears to remain substantially the same.

The rubber stock of which the ribs or projections 3 and also the body portion 2 of the mat are formed is of importance in providing a suitable mat. The stiffer and deader soft rubber stocks produce mats of higher sound deadening efficiency. Accordingly, it is desirable to make mats from a heavily loaded, soft rubber stock. The stock is further improved by having a low efficiency or a relatively high hysteresis loss and low tensile strength, so that it is very dead and relatively non-resilient. Such characteristics may be obtained by using a large percentage of reclaim rubber, and a large proportion of inert fillers, such as clays, etc., having slight or no reinforcing effect. In fact, mats produced from very live or relatively resilient and efficient soft rubber stocks have relatively little sound deadening effect, even when of the preferred construction described above.

The preferred rubber stocks have a durometer hardness of about 50 to 75 and have between 25% and 50% or 60% of rubber, substantially all of which is reclaim rubber, such as whole tire reclaim, the remainder, except for the usual quantities of activators, accelerators, anti-oxidants, softeners and vulcanizing agents, being mostly inert fillers and some carbon black.

In the use of the present invention for reducing the vibration of panels 6, such as automobile floor panels and the like, the mat is placed against the floor with the absorbing ribs 3 in contact with the upper surface 9 of the panel 6. The cuts 7 increase the flexibility of the panel substantially and enable the ribs 3 to closely contact all portions of the panel and follow its movement. Vibration of the panel apparently causes a wiping action of the ribs on the surface of the panel, thus absorbing vibration energy and decreasing the amplitude of vibration of the panel.

Mats embodying the present invention usually have a deadener rating of considerably less than 1 when tested on the apparatus developed by Dr. Geiger, research physicist of the University of Michigan. According to the Geiger method, the sample is placed on a plate 20" x 20" x ¼" of high carbon steel, which is suspended on supports at four points along the nodal line and has been ground to ring like a bell. The sample is placed on the plate to cover its surface and the plate is struck a definite blow. The sound decay is measured by an oscilloscope and recorded on a moving film. The rating is the time in seconds for sound to decay 95 decibels, or to about .0000178 of its amplitude. A lower rating is obviously thus given to the most effective deadener.

The following table gives the results obtained when using Dr. Geiger's apparatus to test various floor mats embodying the present invention:

Table

| Sample | Wt./sq. ft. | Geiger rating | | Length of cuts or slots (¼" spacing) |
| | | (Ribs contacting panel) | (Ribs upward. Flat face contacting panel) | |
|---|---|---|---|---|
| A-unslotted | Pounds .515 | 1.3 | 3.8 | None. |
| B-slotted | .484 | .50 | .72 | 1". |
| C-slotted | .714 | .30 | .49 | 1". |
| D-slotted | .696 | .67 | 1.66 | ½" slots. |
| E-slotted [1] | .702 | .52 | .89 | 1" slots.[1] |

[1] Pairs of slots or cuts staggered instead of adjacent staggered slots or cuts.

As may be seen from the above table, the sound deadening efficiency is increased by an increase in weight of the rubber pad, by having the ribs in contact with the panel, by cutting or slotting the mat so that it can more readily follow the contour of the vibrating panel, by having adjacent cuts or slots staggered, and by increasing the length of the cuts.

While with the sound deadening materials heretofore used, a covering or carpet superimposed thereon effected some improvement in the overall sound rating, a feature of the present invention is that a relatively light carpet further decreases the sound rating to a very marked degree. Thus, when for example a carpet weighing only one-third of a pound per square foot is superimposed over the sample B in the above table, the rating is reduced to .30 or 40%. It is understood of course that any deadener which is cemented is not very effective and requires extreme weight, in practice up to two pounds per square foot; whereas in the case of the deadeners of the present invention, which are not cemented, a much greater sound deadening effect is obtained without excessive weight. The effectiveness of the sound deadener of the present invention is apparent comparing its effectiveness with that of a pad of soft, resilient rubber having the same weight per square foot. Such a pad when tested on the same apparatus had a sound rating three to five times that of the unslotted sample A in the above table.

In the specification and claims, it is intended that the term "cuts" includes slots, slits, and holes having a length several times their width, whether produced by molding or cutting of the material. It is also intended that the term "rubber" includes synthetic rubber, reclaim, as well as natural rubbers.

It is to be understood that variations and modifications of the specific devices herein shown and described for purposes of illustration may be made without departing from the spirit of my invention.

What I claim is:

1. A floor mat for reducing the vibration of vibrating panels, comprising a body portion, and attached to the lower side thereof a plurality of projections of relatively highly filled, stiff and inefficient rubber compound containing a substantial proportion of reclaim rubber, said projections being free to bend in at least one direction, said body portion having a plurality of staggered and spaced cuts having a length several times their width therethrough, whereby said body portion of the mat may be stretched in accordionlike manner and the flexibility of said mat is substantially increased.

2. A floor mat for reducing the vibration of floor panels of motor vehicles, comprising a body portion, and attached to the lower side thereof a plurality of substantially parallel ribs of a vulcanized compounded rubber, said ribs extending to the opposite edges of the mat, being uniformly spaced, being substantially perpendicular to the body of the mat and being of greater length than thickness, being free to bend in at least one direction, and being spaced sufficiently close together to substantially prevent convection currents in the separating air space, whereby substantial thermal insulating value is obtained.

3. A floor mat for reducing the vibration of floor panels of motor vehicles, comprising a body portion, and attached to the lower side thereof a plurality of nonintersecting ribs of highly filled, relatively stiff and inefficient rubber compound containing a substantial proportion of reclaim rubber, said ribs extending to the opposite edges of the mat, being uniformly spaced, being substantially perpendicular to the body of the mat and being free to bend in at least one direction and having a length to thickness ratio of at least one but not substantially more than 4.

4. A floor mat for reducing the vibration of floor panels of motor vehicles, comprising a body portion, and attached to the lower side thereof a plurality of flexible, nonintersecting ribs of relatively stiff, rubber compound, said ribs being of greater thickness at their base, having a height greater than their thickness, and being spaced sufficiently close together to substantially prevent convection currents in the separating air space, whereby increased thermal insulating value is obtained.

5. A floor mat for reducing the vibration of floor panels of motor vehicles, comprising a body portion, and attached to the lower side thereof a plurality of flexible, nonintersecting ribs of highly filled, relatively stiff, inefficient rubber compound containing a major proportion of reclaim rubber, said ribs being substantially uniformly spaced, being free to bend in at least one direction, and extending substantially continuously over the length of said body portion, whereby free bending of the rib is provided.

6. A mat for reducing the vibration of vibrating panels, comprising a body portion, and attached to the lower side thereof a plurality of projections of relatively highly filled rubber compound, said body portion having extending therethrough a plurality of spaced and staggered cuts having a length greater than width whereby the mat may be extended and thereafter contracted relatively easily in at least one direction.

7. A mat for reducing the vibration of vibrating panels, comprising a body portion, and attached to the lower side thereof a plurality of closely spaced parallel ribs of relatively highly filled, stiff and inefficient rubber compound containing a substantial proportion of reclaim rubber, said ribs having greater length than thickness and being free to bend, said body portion having a plurality of spaced and staggered cuts therethrough, the length of said cuts being several times greater than their thickness and the spacing of said cuts being selected so that said body portion may be extended and contracted in accordionlike manner in one direction with the elasticity of said mat sufficient to substantially retract said extended mat to its unextended position on a vibrating panel.

8. A mat for reducing the vibration of vibrating panels, comprising a body portion, and attached to the lower side thereof a plurality of projections of relatively highly filled, stiff and inefficient rubber compound containing a substantial proportion of reclaim rubber, said body portion having a plurality of spaced and staggered cuts which have their major axes substantially parallel to said ribs and extend through said body portion between said ribs, the length of said cuts being several times greater than their thickness and the spacing of said cuts being selected so that said body portion may be extended and contracted in accordionlike manner in one direction with the elasticity of said mat sufficient to substantially retract said extended mat to its unextended position on a vibrating panel.

9. A mat for reducing the vibration of vibrating panels, comprising a body portion, and attached to the lower side thereof a plurality of projections of relatively highly filled, stiff and inefficient rubber compound containing a substantial proportion of reclaim rubber, said body portion having a plurality of spaced and staggered cuts which have their major axes at an angle relative to said ribs and extend through said body portion and said ribs, the length of said cuts being several times greater than their thickness and the spacing of said cuts being selected so that said body portion may be extended and contracted in accordionlike manner in one direction with the elasticity of said mat sufficient to substantially retract said extended mat to its unextended position on a vibrating panel.

10. A floor mat for reducing the vibration of floor panels of motor vehicles, comprising a body portion, and attached to the lower side thereof a plurality of flexible, nonintersecting ribs of highly filled, relatively stiff, inefficient rubber compound containing a major proportion of reclaim rubber, said ribs being free to bend in at least one direction, having a height at least equal to thickness, and extending substantially continuously over the length of said body portion.

11. A floor mat for reducing the vibration of floor panels of motor vehicles, comprising a body portion, and attached to the lower side thereof a plurality of flexible, nonintersecting ribs of highly filled, relatively stiff, inefficient rubber compound containing a major proportion of reclaim rubber, said ribs being free to bend in at least one direction, having a height at least equal to thickness, and extending substantially continuously over the length of said body portion, said body portion having a plurality of spaced and staggered cuts therethrough, whereby the mat may be extended and contracted relatively easily in at least one direction.

12. A mat for reducing the vibration of vibrating panels comprising a web-shaped body portion of a relatively stiff and highly filled inefficient rubbery compound, said compound containing substantial proportions of reclaimed rubber and containing a plurality of spaced and staggered cuts extending therethrough, said cuts having a length several times their width, the spacing of said cuts being such that when said body portion is extended in accordionlike manner the elasticity of said body portion will cause the mat to resume its substantially unextended position when the mat is placed upon a horizontal vibrating panel.

13. A mat for reducing the vibration of vibrating panels comprising a web-shaped body portion of a relatively stiff and highly filled inefficient rubbery compound, said compound containing substantial proportions of reclaimed rubber and containing a plurality of spaced and staggered cuts extending therethrough, said length being from around 1" to around 1½", the spacing of said cuts being of the order of ⅛" and ¼".

PAUL G. PEIK.